United States Patent
Gorohata et al.

(10) Patent No.: US 7,084,541 B2
(45) Date of Patent: Aug. 1, 2006

(54) STATOR COIL MADE OF JOINED CONDUCTOR SEGMENTS FOR ROTARY ELECTRIC MACHINERY AND METHOD FOR MANUFACTURING THE SAME

(75) Inventors: Tetsuya Gorohata, Anjo (JP); Youichi Kamakura, Anjo (JP); Hitoshi Hirano, Anjo (JP)

(73) Assignee: Denso Corporation, Kariya (JP)

( * ) Notice: Subject to any disclaimer, the term of this patent is extended or adjusted under 35 U.S.C. 154(b) by 377 days.

(21) Appl. No.: 10/463,541

(22) Filed: Jun. 18, 2003

(65) Prior Publication Data

US 2003/0233748 A1    Dec. 25, 2003

(30) Foreign Application Priority Data

Jun. 25, 2002    (JP)    ............... 2002-184870

(51) Int. Cl.
*H02K 3/12*    (2006.01)
*H02K 3/04*    (2006.01)

(52) U.S. Cl. ...................... 310/208; 310/180

(58) Field of Classification Search ........... 310/179, 310/180, 184, 185, 195, 198, 201, 208
See application file for complete search history.

(56) References Cited

U.S. PATENT DOCUMENTS

| | | | |
|---|---|---|---|
| 2,393,397 A | 1/1946 | Mullarkey | |
| 6,177,747 B1 * | 1/2001 | Maeda et al. | 310/179 |
| 6,201,332 B1 | 3/2001 | Umeda et al. | |
| 6,222,295 B1 * | 4/2001 | Umeda et al. | 310/179 |
| 6,249,956 B1 | 6/2001 | Maeda et al. | |
| 6,314,780 B1 | 11/2001 | Naka et al. | |
| 6,530,140 B1 | 3/2003 | Maeda et al. | |
| 6,552,463 B1 * | 4/2003 | Oohashi et al. | 310/207 |
| 6,717,317 B1 * | 4/2004 | Akita et al. | 310/184 |

FOREIGN PATENT DOCUMENTS

| | | |
|---|---|---|
| EP | 1 005 137 A1 | 5/2000 |
| EP | 1 041 702 A2 | 10/2000 |
| EP | 1 179 880 A2 | 2/2002 |
| JP | A-2000-92766 | 3/2000 |
| JP | P2000-139049 | 5/2000 |
| JP | P3118837 | 10/2000 |
| JP | P2001-45721 A | 2/2001 |
| JP | P3196738 | 6/2001 |

\* cited by examiner

*Primary Examiner*—Tran Nguyen
(74) *Attorney, Agent, or Firm*—Oliff & Berridge, PLC

(57) ABSTRACT

A stator core that includes electrical insulation between a small conductor segment and large conductor segment which forms stator coils inserted into slots of the stator core of a driving motor for a automobile vehicle. The axial length of the curved head of the small conductor segment is shorter than that of the curved head of the large conductor segment. A distance between slanted portions of the curved heads is greater than the difference between an amount of contraction due to bending of the large segment and the small segment.

4 Claims, 13 Drawing Sheets

STATOR COIL MADE OF JOINED CONDUCTOR SEGMENTS FOR ROTARY ELECTRIC MACHINERY AND METHOD FOR MANUFACTURING THE SAME

BACKGROUND OF THE INVENTION

1. Field of the Invention

The present invention relates to a stator coil constructed by joined conductor segments for rotary electric machines and a method for manufacturing the same.

2. Description of the Related Art

There have been disclosed joined conductor segment stator coils, wherein a plurality of conductor segments inserted into slots of a stator core are sequentially connected one by one. For example, a method for manufacturing the joined conductor coil (joined conductor segment stator coil) by utilizing nearly U-shaped conductor segment in JP No. 3118837.

In JP No. 3118837, legs of a pair of the nearly U-shaped conductor segments are inserted into an entrance of, and are projected from opposite exits of, a pair of slots distant from each other by a magnet pole pitch of a rotor. Then, the projected legs are bent toward the circumferential direction of the rotor and are sequentially joined together.

Therefore, the conductor segment comprises: a nearly U-shaped (nearly V-shaped after bending process as explained below: cf. FIG. 13) head portion; a pair of slot conductor portions which are inserted (along the core axis from one end of a pair of slots and are staying in the pair of slots; and a pair of projected end portions projected from the other end of the pair of slots. Further, the tips of the projected end portions in the pair are joined with each other. Here, in the present specification, the projected end portion together with the slot conductor portion is sometimes denoted as a leg of segment. The head portion is a head side coil end, while the projected end portion is an end side coil end.

Further, there are disclosed also in JP3118837 co-axially disposed two rings for holding four legs of a pair of a small head segment and a large head segment surrounding the small head segment. The rings are relatively rotated in order to form a oblique end portion (a pair of legs oblique toward the circumferential direction of the rotor).

Further, there are disclosed in JP2000-139049A co-axially disposed four rings for receiving four legs of a pair of a small and large segment. Here, the large segment surrounding the small segment.

Further, there is disclosed in JP2001-45721A a method for manufacturing the above-mentioned segment pair (segment set).

An exemplary method for manufacturing the joined conductor coil as disclosed in the above-mentioned prior art documents is explained.

First, a required number of pine needle segments are prepared and are bent to have U-shaped heads. Then, a pair of legs of the segments are bent along the circumferential direction by a magneto pole pitch and required number of pairs of segments are arranged along the circumreferential direction in order to simultaneously insert them into all the slots of the core. The two rings (co-axially disposed) with a plurality of holes as shown in FIG. 3 in JP No. 3118837 may be employed. Concretely, the segment legs are inserted into the outer and inner rings at the same circumferential direction and then the inner and outer rings are relatively rotated in order to deform the head portion of the segment in such a manner that the head portion is made open like a V-shape.

Further, a process step follows for inserting the V-shaped deformed segments which are arranged along the circumeferential direction into the slots of the stator core. Concretely, holding the head portions, the segment sets are pulled out from the rings and are inserted into the slots.

Further, a process step follows for bending, preferably by a half pitch of the magneto pole, the projected end portion along the circumferential direction. The two rings (co-axially disposed) with a plurality of holes as shown in FIGS. 4 and 5 in JP No. 3196738 may be employed for the above-mentioned bending step. The projected end portion is inserted into the holes, then the inner and outer rings are relatively rotated by a half pitch of the magnet pole and then the projected end portion is bent by the half pitch along the circumferential direction. The radius of curvature at the bending point can preferably be made larger, if the rings are pressed along the axial direction toward the projectted end portion. Further, a process step follows for welding the projected end portions each other in a prescribed order.

Thus, a phase coil is endlessly formed. Therefore, terminals for each phase are formed by cutting the head portion of the U-shaped segment. If the terminal is made long beforehand, the long terminal can be utilized for a crossover for a neutral point. It is noticed that the terminal is provided at the head portion side, because the long terminal wire is obstructive against the welding of the projected end portions.

The joined segment stator coil as manufactured by the above-explained processes has been employed for a stator coil of AC dynamo for automotive vehicles.

However, the conventional joined segment stator coil has a disadvantage that the width of the head portion becomes greater than that of the pair of legs, because the head portion with a prescribed radius of curvature is bent by an electric angle $\pi/2$. The radius of curvature is preferably as small as possible. However, the radius reduction is limited, because a damage of insulating coating on the smaller head portion should be prevented and the segment should be easily bent.

Accordingly, the width of the head portion of the large segment inevitably becomes greater than that of its legs. This is because four legs of the small and large segments must be received in the four portions along the radial direction of the slots.

Further, when the linear portions held in the rings are bent along the circumferential direction before insertion into the stator core, the small segment sink more deeply toward the rings than the large segment. Thus, it became clear that the smaller head portion is apt to contact with the larger head portion near the linear portion of the large segment, thereby degrading an insulation between them.

FIG. 14 is a side view of a segment set of a small segment 332 and large segment 331 before bending, while FIG. 15 is a side view of the segment set after bending. As shown in FIGS. 14 and 15, the large segment 331 comprises a larger head portion 3a and a pair of linear leg portions 3b, while the small segment 332 comprises a smaller head portion 3a' and a pair of linear leg portions 3b'.

SUMMARY OF THE INVENTION

An object of the present invention is to improve an insulation between the smaller head portion and larger head portion in a stator coil for a rotary machinery made of joined conductor segments.

The present invention has four Features as stated below.

In Feature 1 the method for manufacturing a stator coil of the present invention comprises the steps of:

preparing a plurality of segment sets each of which comprises: a small segment wherein a segment is turned around to form a pair of parallel linear legs and a width of the turned around head is wider than a total width of the pair of legs; and a large segment which surrounds the small segment head, by extending the large segment legs in parallel outside the small segment legs;

enlarging a distance between the small segment legs and distance between the large segment legs, simultaneously, by using an inner and outer rings, in such a manner that: the small segment legs are received in the inner and outer rings; the large segment legs are received in the inner and outer rings; and the outer and inner rings are relatively rotated; and joining sequentially the legs in such a manner that: the enlarged segments are inserted into slots of the stator; tips of the legs are projected from other end of the slots; and the leg tips are bent almost along a circumferential direction of the stator, characterized in that a border between the leg and head of the large segment is extended toward its leg tips from a border between the leg and head of the small segment, in such a manner that the small segment head is not forced out of the large segment head.

According to Feature 1, the small and large segment heads do not contact with each other, thereby preventing a degradation of an electrical insulation of the stator coil, even when the small segment head is bent toward its legs more deeply than the large segment head during the leg enlarging (bending) process. This is guaranteed by sufficiently separating the bottom portion of the small segment head from a border between the head and legs of the large segment before the enlarging process.

In Feature 2, the stator coil of the present invention comprises:

a plurality of segments each of which is received in stator core slots having an even number of receiving positions in a radial direction, thereby constructing one turn in a phase coil in M (integer greater than or equal to 3) phase coils;

the segment comprising: a pair of slot conductor portions each of which is received in a receiving position different with each other in a pair of slots distant by a prescribed pitch; a head portion which is a head coil end and is projected toward an end of the stator core; and a pair of projected end portions each of which is another coil end and is projected from another end of the stator core;

the head portion comprising: a U-shaped head tip portion; and a pair of head oblique portions each of which is stretched obliquely along the radial and axial directions of the stator core;

the projected end portion comprising: a pair of end oblique portions each of which stretches obliquely along the radial and axial directions of the stator core; and a pair of end tip portions each of which is formed at a tip of the end oblique portion and joined with an end tip of different end tip portion;

the head portions are being arranged along the radial direction of the stator core;

the projected end portions are being arranged along the radial direction of the stator core, characterized in that:

the segment comprises: a small segment which is received in a pair of the receiving positions adjacent along the radial direction; a large segment which is received in another pair of the receiving positions; and there is a prescribed gap along the axial direction of the stator core between the head tip portion of the small segment and head tip portion of the large segment.

According to Feature 2, the small segment is sufficiently insulated from the large segment, due to an assured radial gap between their head tips.

Further, the small and large segments are joined with each other in accordance with the method as stated in Feature 1, thereby assuring the above-mentioned radial gap. Further, it is preferable that the radial gap be assured between the bottom portions as well as the head tips.

In Feature 3, the stator coil as stated in Feature 2 is characterized in that:

the segments with the same radial positions which are arranged along the circumferential direction construct a group of partial phase coils to which a prescribed phase voltage is applied; and the phase coil is constructed in such a manner that one partial phase coil is sequentially joined in series with another partial phase coil adjacent with each other along the radial direction.

Conventional rotary machinery employing a stator coil made of conductor segments sequentially joined with each other are used for an AC dynamo for automotive vehicles. Further, the rotary machinery as a driving motor for the automotive vehicle is being expected to be highly powered. Here, the highly-powered driving motor must be supplied with a battery voltage of several hundred voltages far more higher than the conventional motor, due to an easy wiring in its manufacturing process and reduction of resistance loss in the stator coil. However, the rotation speed of the highly-powered driving motor is almost the same as that of the conventional motor. Therefore, the highly-powered driving motor must be provided with a greater number of turns in the stator coil.

Although the number of turns may be increased by, e.g., 5 segments 33*a* through 33*e* as shown in FIG. 16, the required number of segments are disadvantageously increased and the head of the outermost segment 33*e* becomes longer, thereby increasing the wiring resistance.

Further, the width W of the head H as shown in FIG. 16 becomes considerably greater than a total width of the leg portion, thereby increasing an axial length of the motor and its weight.

Further, the gap "d" must be assured between the legs as well as between the heads in order to prevent them from rubbing with each other during the enlarging process. Thus, the conventional stator coil as shown in FIG. 16 has a disadvantage that the slot space is not efficiently occupied by the conductor segments.

Furthermore, the conventional stator coil has another disadvantage that the heat radiation of the inner segment 33*a* becomes worse.

In order to overcome those disadvantages, the phase coil of the present invention is constructed in such a manner that: a plurality of segment sets, e.g., 4 segment sets as shown in FIG. 3, is received at adjacent radial positions in a slot; the prescribed segment sets along the circumferential direction are connected in series with each other, thereby forming partial phase coils; and a partial phase coil is connected in series with the adjacent partial coil sequentially, thereby completing the phase coil in M phase coils.

According to Feature 3, the partial phase coils are easily connected with each other in the radial direction by using connecting segments. Thus, the partial phase coils are made uniform enough to prevent them from causing a local over-heating due to a local concentration of an electric current due to a fluctuation in their wiring lengths.

In Feature 4, the stator coil according to Feature 3 is characterized in that:

the stator coil has groups of slots adjacent with each other along the circumferential direction, and each of the groups is of the same phase to which the same phase voltage is applied;

the stator coil has series phase coil circuits each of which is formed in such a manner that the partial phase coils with adjacent radial positions in a slot are sequentially joined in series, and each of the phase coils are formed in such a manner that the series phase coil circuits are connected in parallel.

Conventional rotary machinery employing the conductor segment stator coil is used for an AC dynamo for automotive vehicles. Further, the rotary machinery as a driving motor is being expected to be highly powered. Therefore, a large electric current is required to obtain a highly-powered driving motor. There is a limitation in increasing a cross section of the conductor segment in order to allow the large electric current to flow. Therefore, the partial phase coils may be connected in parallel in order to increase the total cross section of the phase coil. However, the parallel connection as mentioned above was not easy during the sequential connection of the segments, because extra wires are required in order to pass over the segments with each other.

Therefore, in Feature 4, a plurality of series phase circuit are received in different slots in a slot group of the same phase.

According to Feature 4, the wiring resistances of the series phase circuits are made uniform, thereby making uniform the currents in the partial phase coils. Further, even when there is a resistance fluctuation among the partial phase coils disposed at different radial positions, any resistance fluctuation between the above-mentioned series phase coils are not caused. That is an advantage of great importance.

Thus, according to Feature 4, the number of turns of the stator coil can be increased without using any segment sets including a greater number of conductor segments and without adding any passing-over wires at the coil end.

PREFERRED EMBODIMENT OF THE INVENTION

Figure 1:
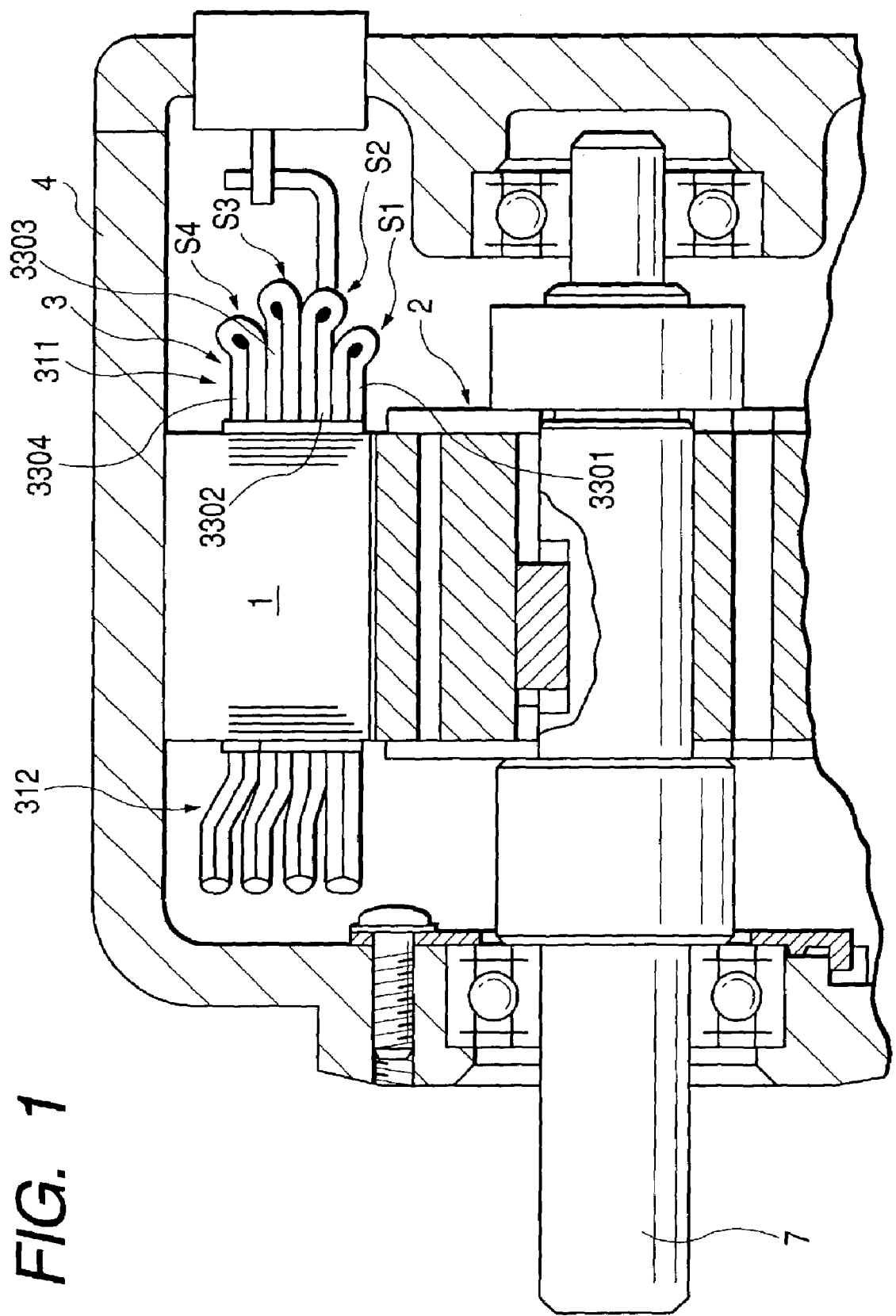
FIG. 1 is a vertical cross sectional view of a motor employing the stator coil of the present invention for driving a automotive vehicle.
Figure 2:
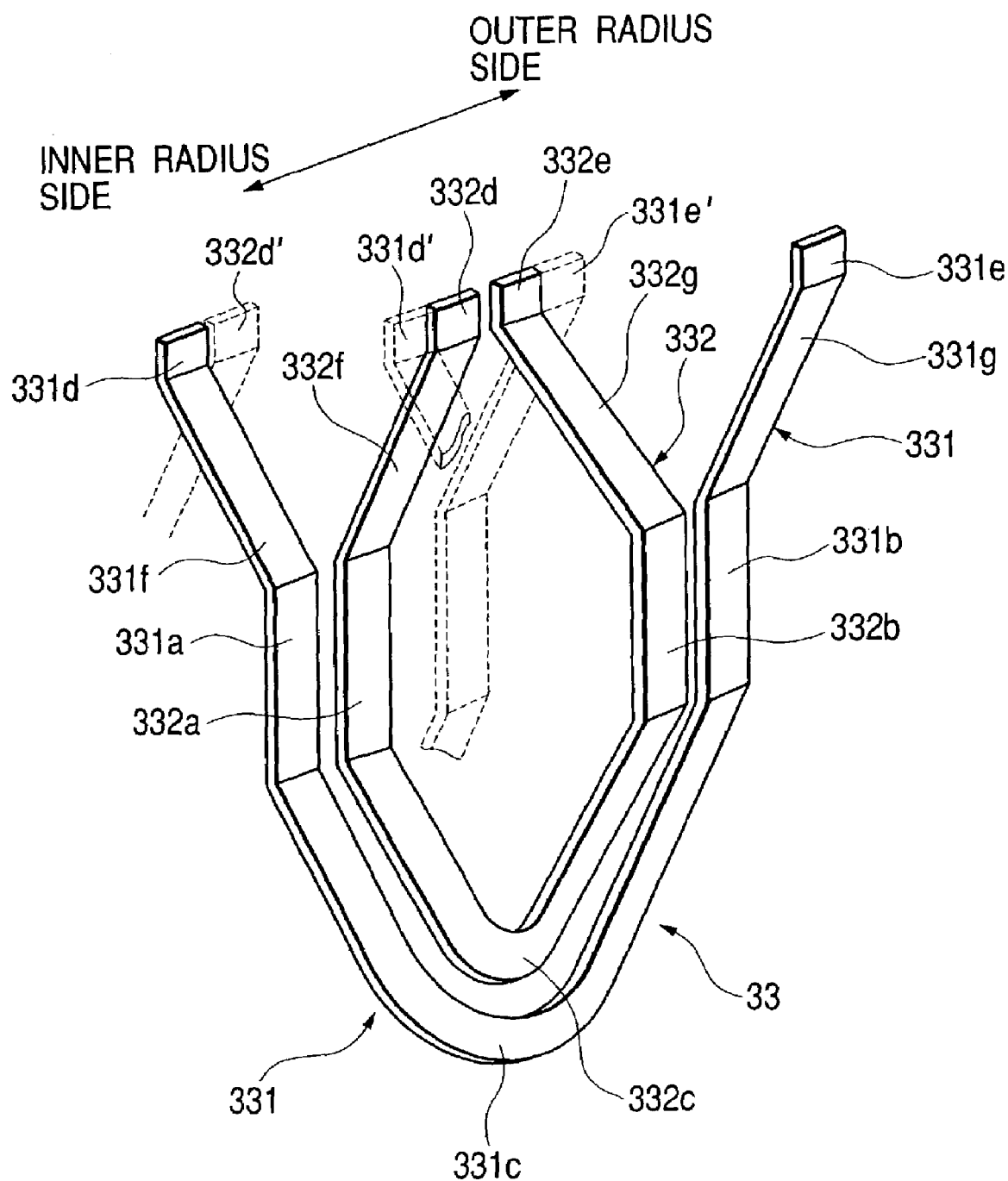
FIG. 2 is a schematic perspective view of the segment pair as shown in FIG. 1.
Figure 3:
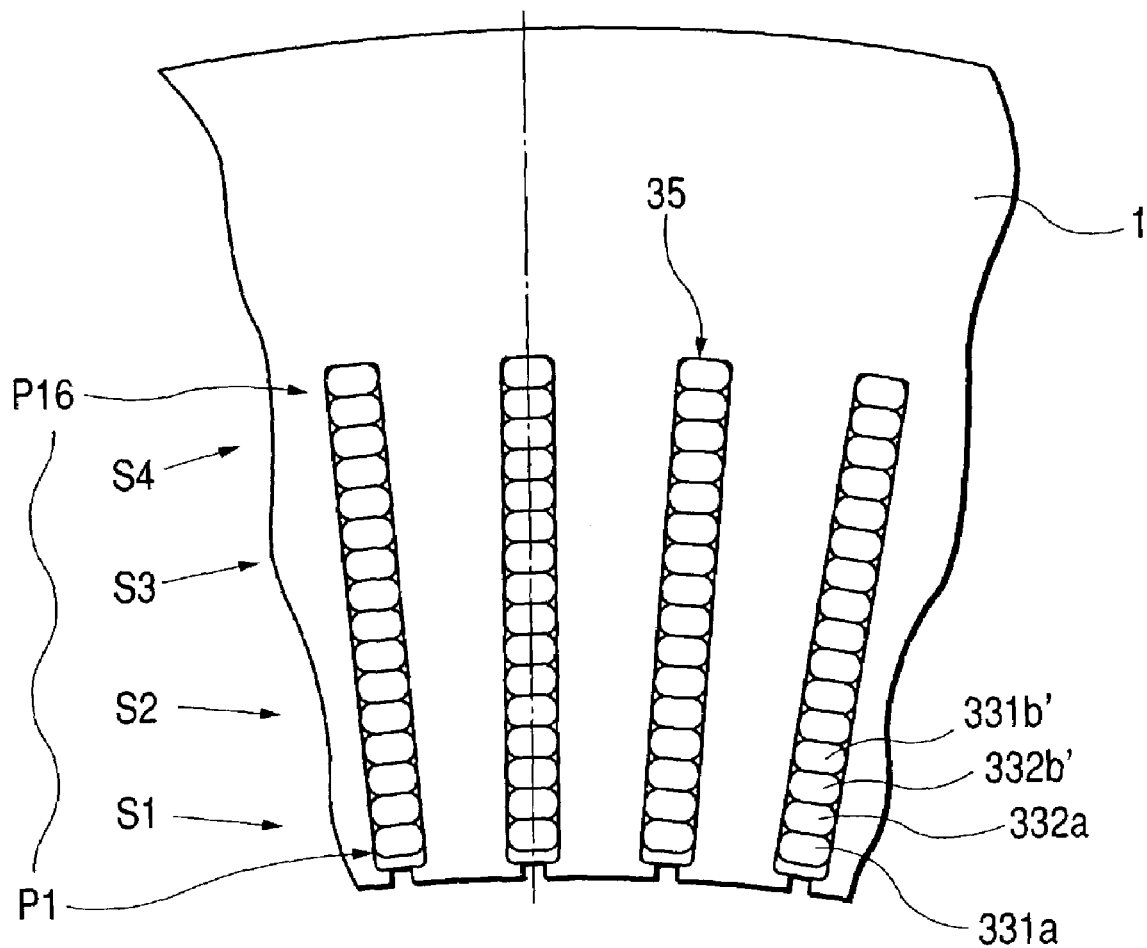
FIG. 3 is a partial cross sectional view of the stator core as shown in FIG. 1.

A preferred embodiment of the present invention is explained, referring to the drawings. FIG. 1 is a cross sectional view along the axial direction of the rotary machinery for a motor employing the stator coil of the present invention for driving an automotive vehicle, wherein coil end portion of the stator coil is schematically illustrated. FIG. 2 is a perspective view of a conductor segment set. FIG. 3 is a partial cross sectional view of segments received in the slots of the stator core.

Driving Motor

As shown in FIG. 1, the driving motor comprises a stator core 1, a rotor 2, a stator coil 3, a hausing 4 and a rotating axis 7. The stator core 1 is fixed at an inner wall of the hausing 4, while the stator coil 3 is wound through the slots of the stator core 1. The rotor 2 is an IPM rotor fixed with the rotating axis 7 rotatably supported by the hausing 4, and is disposed inside the stator core 1. The stator coil 3 is a three phase armature winding coil which is fed by a three phase inverter fed by an external battery of about, e.g., 300 V.

The driving motor is a permanent magnet three phase brush-less DC motor (synchronous motor) for generating a driving force for, e.g., a secondary battery car, fuel cell car, or hybrid car. Its rotor structure may be modified in various publicly known forms of which explanations are omitted.

Stator Coil.

As shown in FIG. 2, the segment set 33 of the stator coil 3 is inserted from one side of the stator core 1 through the slots of the stator core, is then projected by a prescribed length from the other side of the stator core 1. Further, the projected end portions of the segment set 33 are bent by an electrical angle of about π/2 along the circumferential direction of the stator core 1. Further, tips of the projected end portions are welded in a prescribed combination. Here, each segment of the segment set 33 is a V-shaped long plate as shown in FIG. 2 coated by a resin except for a pair of leg tips (welding portions).

The segment set 33 comprises a large segment 331 and small segment 332 each of which comprises: a V-shaped head portion; a pair of slot conductor portions linearly extended from both sides of the head portion and received in the slots; and a pair of the projected end portion extended from the slot conductor portions. In other words, the stator coil has three part: a first coil end at one side of the stator core 1; a second coil end at the other side of the stator core 1; and the slot conductor portion received in the slots.

The head coil end 311 as shown in FIG. 1 is above-mentioned first coil end, while projected coil end 312 as shown in FIG. 1 is above-mentioned second coil end.

As shown in FIG. 1, four segments are inserted along the radial direction of the stator core 1. The head portion 3301 is of the innermost segment set S1; the head portion 3302 is of the second innermost segment set S2; the head portion 3303 is of the third innermost (second outermost) segment set S3; and the head portion 3304 is of the outermost segment set S4. The head portions 3301,3302,3303 and 3304 sequentially arranged along the radial direction construct the head coil end 311. Similarly, there are illustrated the projected coil end 312 in FIG. 1.

Segment Set

As already mentioned, the segment set 33 as shown in FIG. 2 comprises the large segment 331 and small segment 332.

The large segment 331 comprises the slot conductor portions 331a and 331b, the head portion 331c and the projected end portions 331f and 331g. The tips 331d and 331e of the projected end portions 331f and 331g, respectively, are joining (welding) portions. The slot conductor 331a is the innermost slot conductor portion, while the slot conductor 331b is the outermost slot conductor portion.

Similarly, the small segment 332 comprises the slot conductor portions 332a and 332b, the head portion 332c and the projected end portions 332f and 332g. The tips 332d and 332e of the projected end portions 332f and 332g, respectively, are joining portions. The slot conductor 332a is the second innermost slot conductor portion, while the slot conductor 332b is the second outermost slot conductor portion.

An element with dashed ("'") reference numeral is welded with a similar element without dash illustrated by dotted lines at the position adjacent along the radial direction. Thus, the joining portion 331d is welded with joining portion 332d'. Further, the joining portion 332d is welded with joining portion 331d'. Further, the joining portion 332e is welded with the joining portion 331e'.

When the right legs of the slot conductor portions 331a and 332a are received in a slot, the left legs of the slot conductor portions 331b and 332b are received in another slot distant by a prescribed odd number pitch of magnet pole (e.g., one magnet pole pitch (electrical angle □)). Before and after the insertion, the small head portion 332c is kept surrounded by the large head portion 331c.

Arrangement of Segment Sets in Slots

As shown in FIG. 3, a plurality of, e.g., 16 positions P1 to P16 for receiving the conductor segments are prepared. Each position receives a slot conductor portion. four segment sets S1 to S4 are sequentially received along the radial direction in such a manner that S1 is received in P1 to P4, S2 is received in P5 to P8, S3 is received in P9 to 12 and S4 is received in P13 to P16. Here, each of S1 to S4 is made of a plurality (for example, two, as shown in FIG. 2) of segments, respectively.

Figure 4:
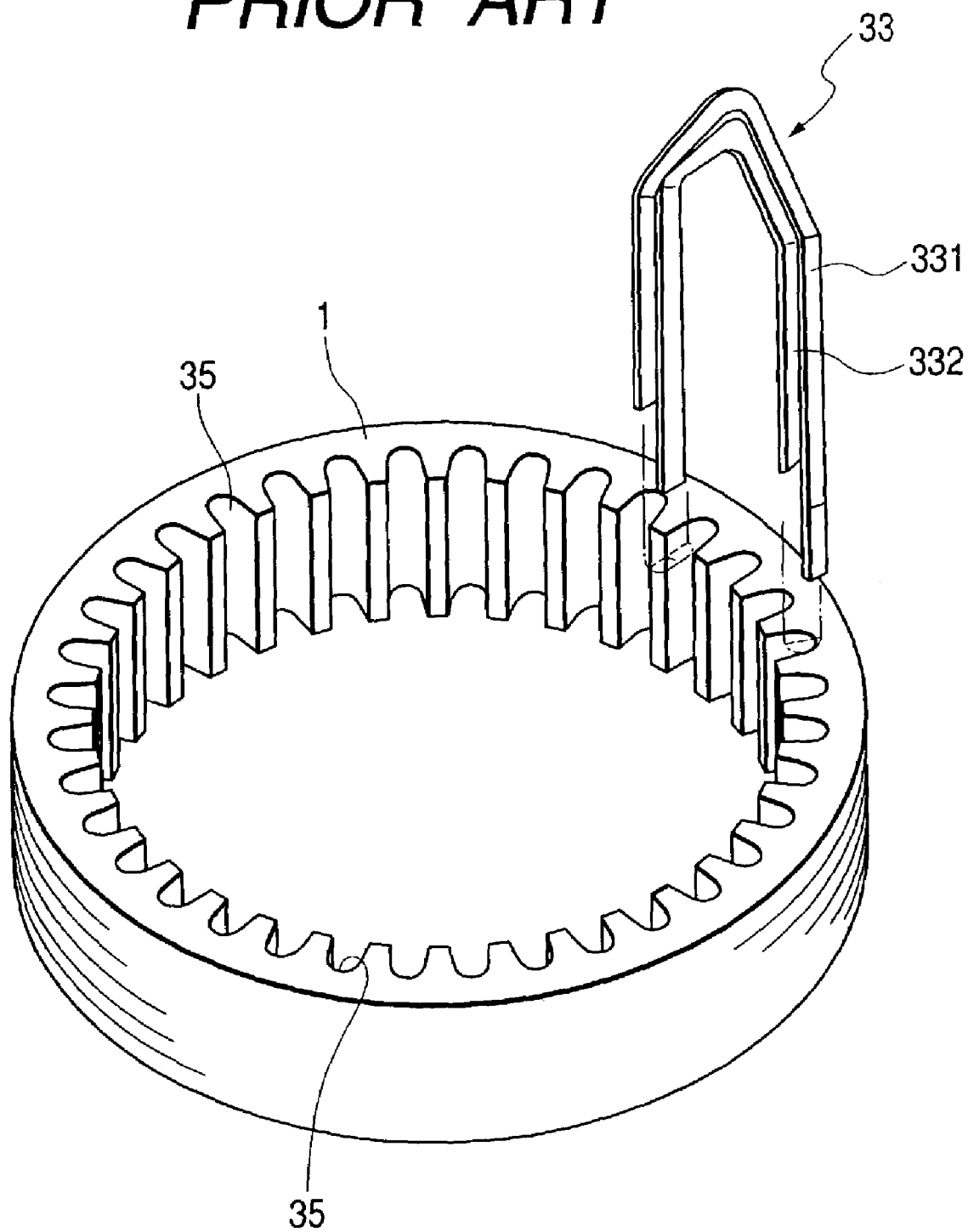
FIG. 4 schematically shows one of the segment pair before being inserted into the slots of the stator core.

As for the innermost segment set S1, the innermost slot conductor portion 331a is disposed at the innermost position of the slot 35 of the stator core 32. Then, the second innermost slot conductor portion 332a, the second outermost slot conductor portion 332b' and the outermost slot conductor 331b' are sequentially disposed in this order toward the outer radial direction. The other segment sets S2 through S4 have similar arrangements and structures. Each segment set 33 constructed by the large segment 331 and small segment 332 is inserted into two slots distant by a prescribed pitch of the magnet pole, as shown in FIG. 4.

Structure of Three Phase Stator Coil

Figure 9:
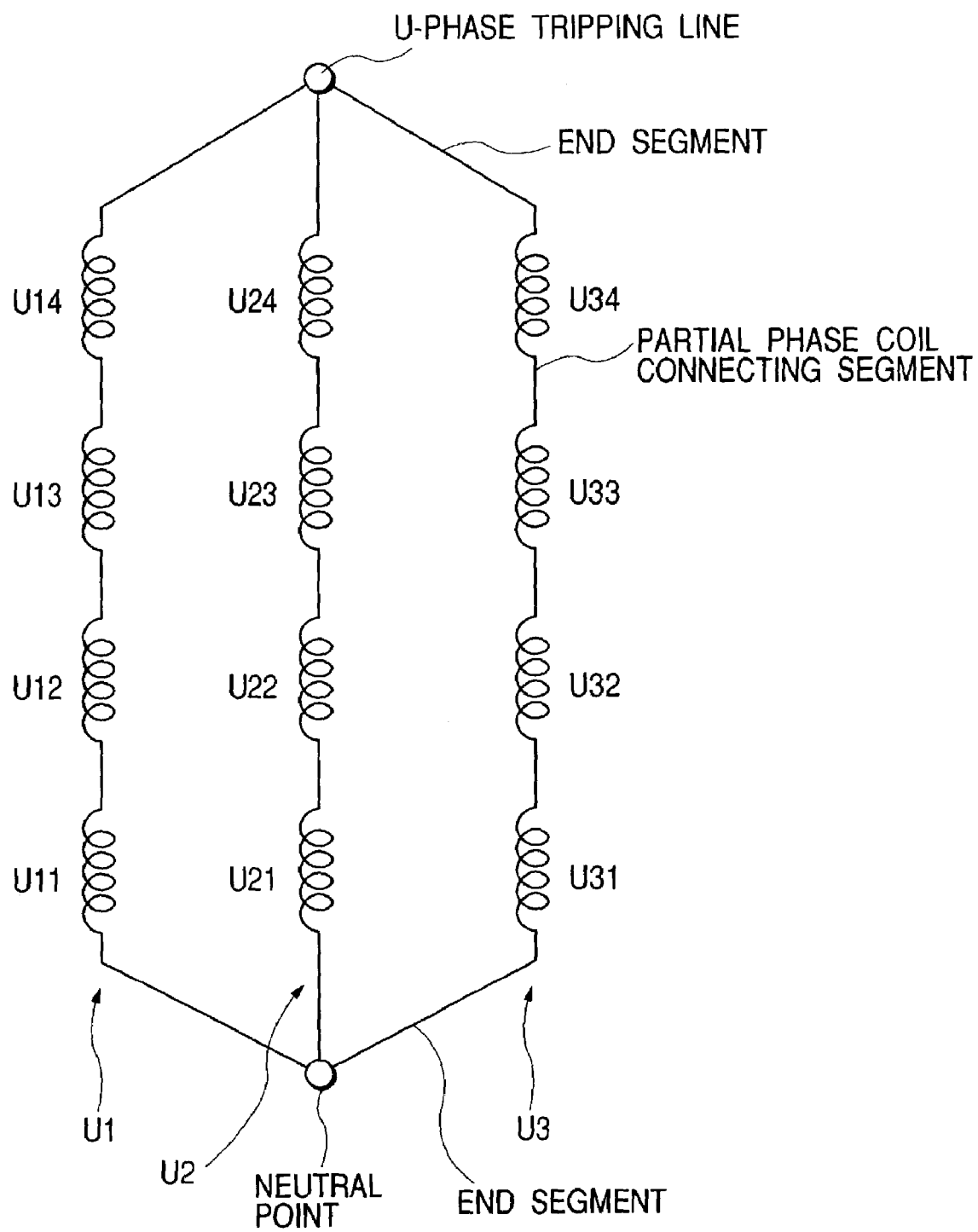
FIG. 9 is wiring diagram of the U phase of the stator coil.

FIG. 9 is a circuit diagram of the three phase stator coil wherein S1 to S4 are arranged along the radial direction.

For example, there are 108 slots in a stator (9 slots every magnet pole pitch (3 slots each of the three phases, 12 poles). The adjacent three slots are in phase wherein the same phase voltage is applied. There are formed in the slot along the radial direction 16 positions P1 to P16 for receiving the slot conductor portions.

The segment sets S1 received at P1 to P4 counted from the innermost side along the radial direction are connected with each other by such a method as the wave winding in order to form three first partial phase coils. The coils U11, U21, U31 as shown in FIG. 9 are the first partial coils. The partial coils U11, U21 and U31 are received at slots adjacent with each other.

The segment sets S2 received at P5 to P8 counted from the innermost side along the radial direction are connected with each other by such a method as the wave winding in order to form three first partial phase coils. The coils U12, U22 and U32 as shown in FIG. 9 are the first partial coils. The partial coils U12, U22 and U32 are received at slots adjacent with each other.

The segment sets S3 received at P9 to P12 counted from the innermost side along the radial direction are connected with each other by such a method as the wave winding in order to form three first partial phase coils. The coils U13, U23 and U33 as shown in FIG. 9 are the first partial coils. The partial coils U13, U23 and U33 are received at slots adjacent with each other.

The segment sets S4 received at P13 to P16 counted from the innermost side along the radial direction are connected with each other by such a method as the wave winding in order to form three first partial phase coils. The coils U14, U24 and U34 as shown in FIG. 9 are the first partial coils. The partial coils U14, U24 and U34 are received at slots adjacent with each other.

The partial phase coils U11, U12, U13 and U14 are received in the first slot (counted from one side along the circumferential direction) among the three adjacent slots. Similarly, the partial phase coils U21, U22, U23 and U24 are received in the central slot (counted from one side along the circumferential direction) among the three adjacent slots. Similarly, the partial phase coils U31, U32, U33 and U34 are received in the last slot (counted from one side along the circumferential direction) among the three adjacent slots.

The partial coils U11, U12, U13 and U14 adjacent with each other along the radial direction are sequentially connected in series with each other, thereby forming a series partial coil U1. Similarly, the partial coils U11, U12, U13 and U14 adjacent with each other are sequentially connected with each other, thereby forming a series partial coil U2. Similarly, the partial coils U31, U32, U33 and U34 adjacent with each other are sequentially connected with each other, thereby forming a series partial coil U3. The coil Uij is connected with Uik (k=j+1) by inserting a V-shaped segment.

For example, one of the segments, preferably a large segment of U12 is pulled out, thereby forming a vacant pair of the conductor receiving positions, while one of the segments, preferably a large segment of U13 is pulled out, thereby forming another vacant pair of the conductor receiving positions. Then, two of the four vacant positions are utilized to connect U12 with U13 in such a manner that the above-mentioned V-shaped segment is inserted into the above-mentioned two of the four vacant positions.

Further, one of the segments, preferably a large segment of U11 is pulled out, thereby forming a vacant pair of the conductor receiving positions. Then, one of the two vacant positions of U11 and the rest of the vacant positions of U12 are utilized to connect U11 with U12.

Further, a V-shaped segment for a neutral point or pull-out terminal is inserted into the rest of the vacant positions of U11, while another V-shaped segment for a pull-out terminal or neutral point is inserted into the rest of the vacant positions of U14.

Thus, a phase coil (U-phase coil) is formed by connecting both ends with each other of U1, U2 and U3. V-phase coil and W-phase coil are formed similarly.

Next, manufacturing processes for manufacturing the stator coil of the present invention are explained.

Head Portion Bending

First, a required number of two kind of conductor segments (small segments 332 and large segments 331) are prepared. Here, their legs adjacent with each other are extended linearly and their head portions are sharply bent) are prepared. The segment pairs are arranged along the circumferential direction in order to simultaneously insert them into the slots of the stator core.

Figure 5:
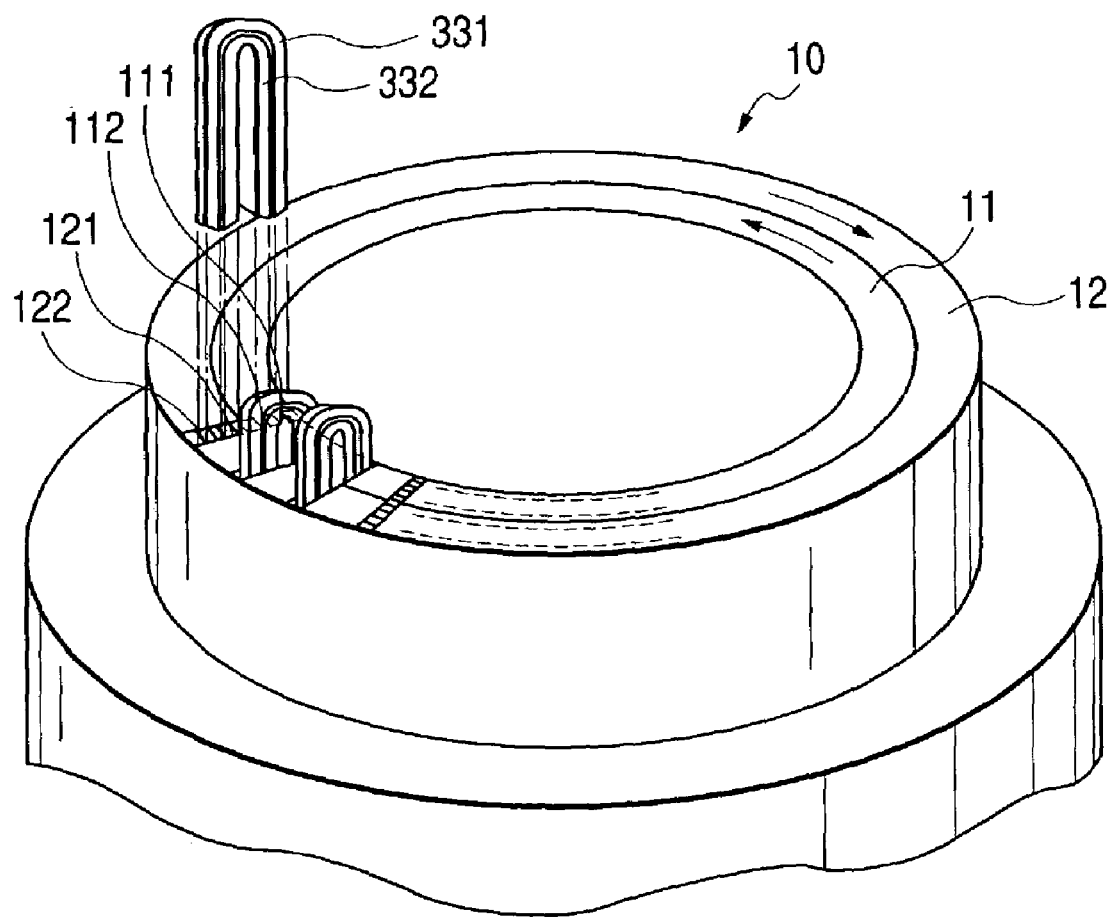
FIG. 5 schematically shows the segments which are being inserted into the large and small ring s of the segment bending apparatus.

As shown in FIG. 5, the bending apparatus 10 comprises a small ring 11 and a large ring 12. They are disposed co-axially and are relatively rotatable. There are provided in the large ring 12 pairs of holes 121 and 122 arranged along the radial direction and separated at a prescribed pitch along the circumferential direction. Similarly, there are provided in the small ring 11 pairs of holes 111 and 112. Here, the holes 111 & 112 and 121 & 122 are arranged in a row along the radial direction, respectively. Then, a slot conductor portion (the right leg) of the large segment 331 is inserted into the innermost hole 111, while the other slot conductor portion (left leg) is inserted into the outermost hole 122. Further, a slot conductor portion (the right leg) of the small segment 332 is inserted into the second innermost hole 112, while the other slot conductor portion (the left leg) is inserted into the second outermost hole.

Figure 6:
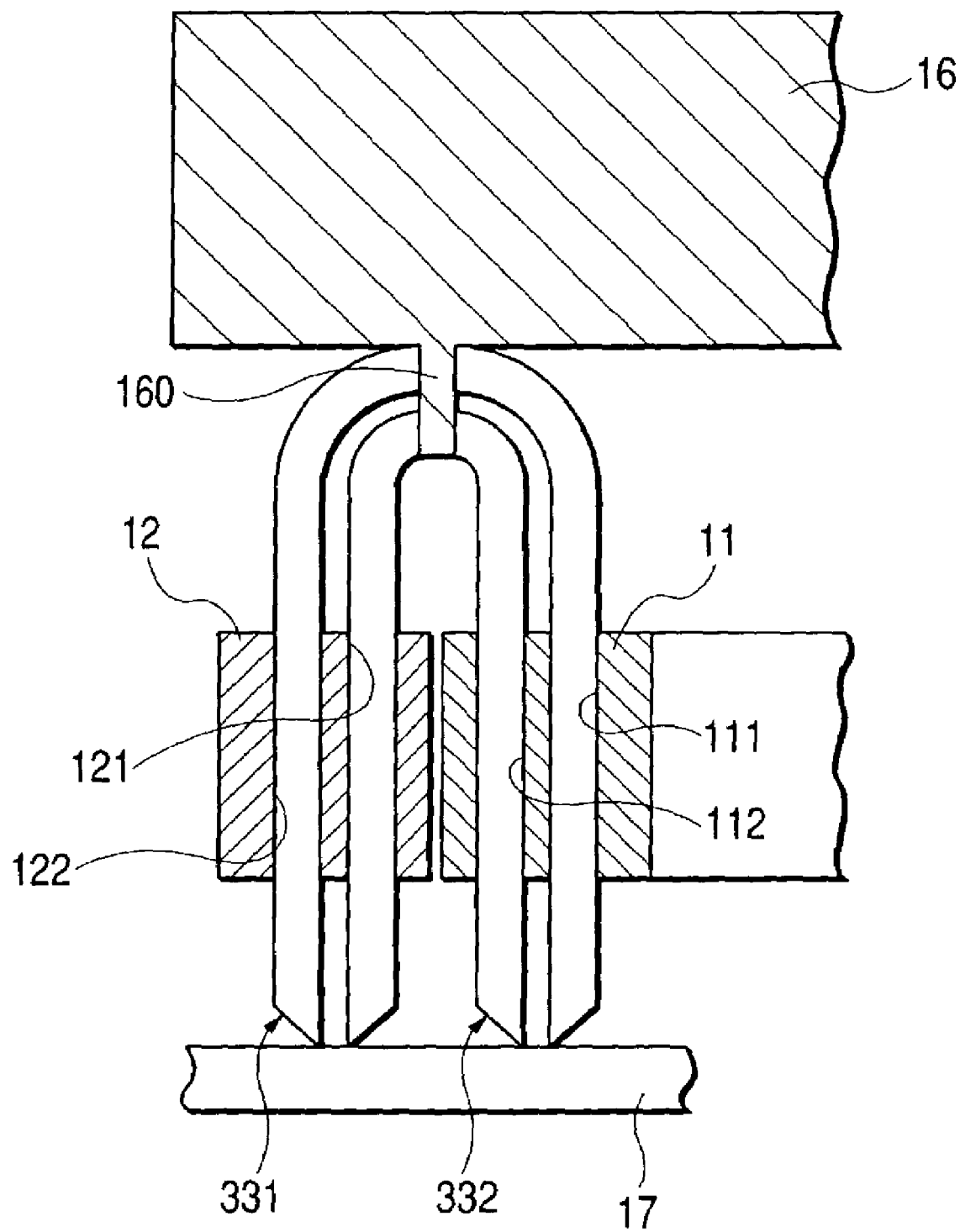
FIG. 6 is a schematic vertical cross sectional view of large and small ring s of the segment bending apparatus.

As shown in FIG. 6, all the large and small segments 331 and 332 are inserted into the holes 111 & 122, 112 & 121 of the large and small ring s 11 and 12. A plate 16 for pushing the head portions is disposed over the large and small rings 12 and 13. Further, the plate 16 is provided with a nail 160 which holds the head portions of the segment sets from both sides along the circumferential directions. Concretely, after inserting all the segment sets, the plate 16 descends in order to holds the head portions.

Then, the large ring 12 is rotated in a direction reverse to the small ring by a half magnet pole pitch, thereby extending their the head portions by a magnet pitch along the circumferential direction.

During rotating the rings 11 and 12, the head portions are fallen down along the axial direction of the rings. Accordingly, the plate 16 is also fallen down. On the other hand, plate 17 supports upwardly the segments 331 and 332. The plate 17 may be divided into an outer and inner plates which are fixed and rotated together with the large and small rings, respectively.

Then, during holding the segment sets by the nail 160 of the plate 16, the large and small ring s 12 and 11, respectively, are separated from the segment set.

End Portion Inserting

After pulling out the segments 331 and 332 from the rings 11 and 12, the small segment 332 is inserted into the second innermost position and second outermost position of a pair of the slots 35, while the large segment 331 is inserted into the innermost position and outermost position of the pair of the slots 35, as shown in FIG. 4. During the insertion processes, the head portion of the segments 331 and 332 are held together by the plate 16, thereby inserting all the segments simultaneously into the slots. After completing the segment insertion, the plate 16 is separated from the segments.

However, modified or other methods and apparatuses for inserting the segment pairs into the slots may be employed.

End Portion Bending

The end portion 331g of the outermost slot conductor portion 331b of the large segment 331 is bent toward a direction along the circumferential direction, while the end portion 331f of the innermost slot conductor portion 331a of the large segment 331 is bent toward the opposite direction along the circumferential direction. Further, as shown in FIG. 4, the end portion 332f of the second outermost slot conductor portion 332a of the small segment 332 is bent toward the above-mentioned opposite direction along the circumferential direction, while the end portion 332g of the second innermost slot conductor portion 332b of the small segment 332 is bent toward the direction opposite to the above-mentioned opposite direction along the circumferential direction. The slot conductor portions 331f and 331g are bent and separated relatively by a magnet pole pitch from the slot conductors 332f and 332g, respectively.

Figure 7:
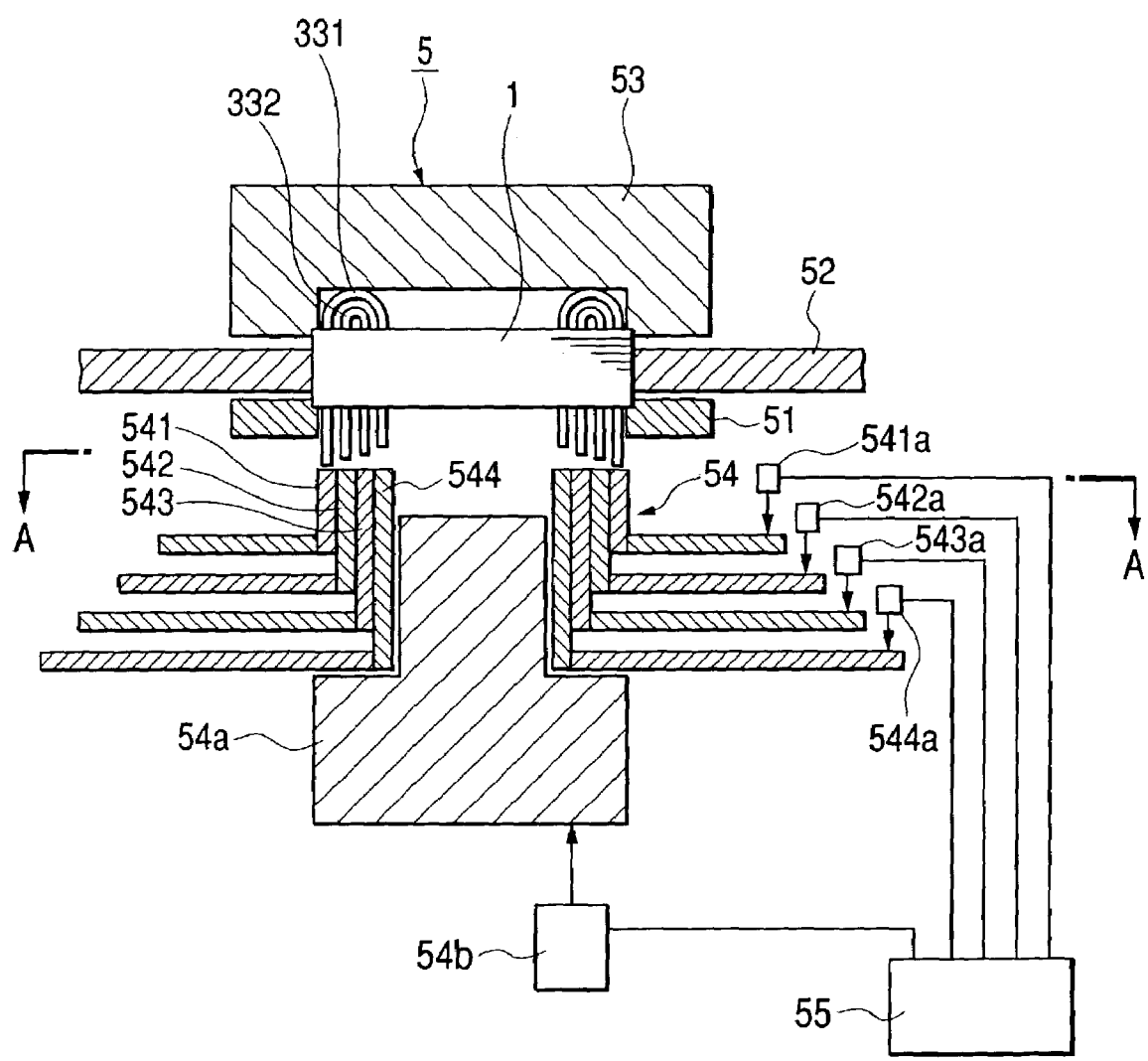
FIG. 7 is a schematic vertical cross sectional view of the segment bending apparatus as a whole.
Figure 8:
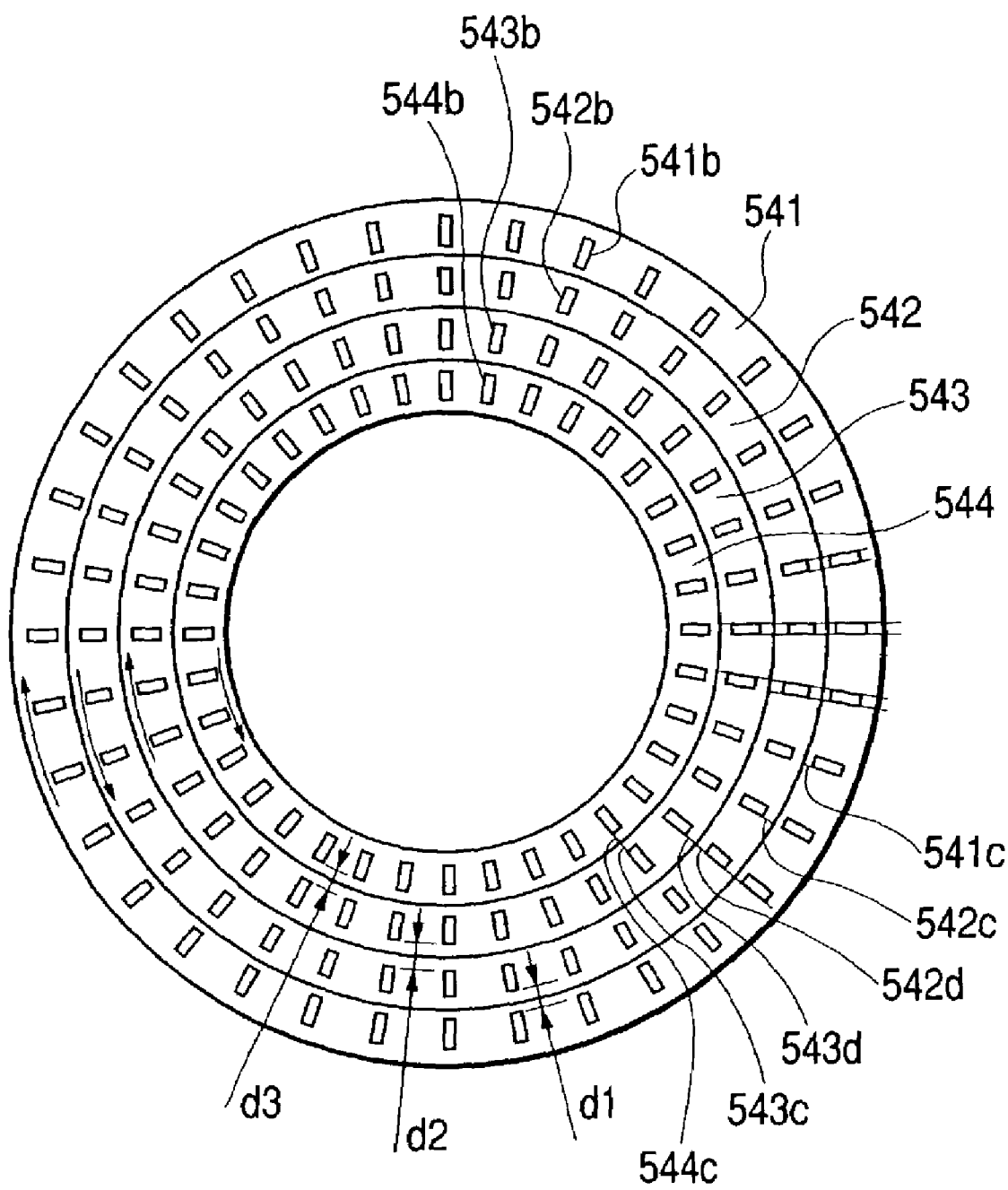
FIG. 8 is a plan view of the large and small ring s.

The end portion bending process is explained in further details, referring to FIGS. 7 and 8. FIG. 7 is a schematic longitudinal vertical cross sectional view of the stator coil bending apparatus. FIG. 8 is a sectional view along line A—A.

The stator coil bending apparatus 500 comprises: a work receiver 51 for receiving the outer circumference of the stator core 1; a dumper 52 for prohibiting a radial motion of the stator core 1; a work weight 53 for preventing the stator core 1 from floating up; a bending bed 54 for bending the projected leg portions which are projected from the stator core 1, a shaft 54a for moving up and down axially the bending bed 54; rotating mechanisms 541a through 544a for rotating along the circumferential direction the bending bed 54; a shaft driving mechanism 54b for moving up and down the shaft 54a; and a controller 55 for controlling the rotating mechanisms 541a through 544a and shaft driving mechanism 54b.

There are in bending bed 54 cylindrical bending jigs 541 through 544 (of which end surfaces are disposed on a surface) which are disposed co-axially, are rotatable independently by the rotating mechanisms 541a through 544a, respectively and are further moved up and down by moving the shaft 54a by using the shaft driving mechanism 54b.

As shown in FIG. 8, There are formed on the end surfaces of the cylindrical bending bed jigs 541 through 544 segment inserting portions 541b through 544b for holding the tips of the end portions 331f, 331g, 332f and 332g. The total slot number is equal to the number of the segment inserting portions 541b through 544b formed along the circumferential direction of the bending jigs 541 through 544.

As shown in FIG. 8, there are provided walls 541c through 544c, 542d and 543d for preventing mutual connection of the segment inserting portions 541b through 5444b. The distance d2 between the walls 542d and 543d are made greater than the distances d1 and d3, where d1 is the distance between the walls 541c and 542c, and d3 is the distance between the walls 543c and 544c.

Next, the operation of the stator coil bending apparatus is explained.

The stator core 1 of which slots 35 receive the segment sets 33 is received by the work receiver 51 and then, the outer circumference of the stator core 1 is fixed at the clumper 52. Then, the work weight 53 presses the upper portion of the stator core 1 and head portions 331c of the large segments 331, thereby preventing the stator core 1 and segment sets 33 from moving up and down.

After fixing the stator core 1 having segment sets 33 by using the dumper 52 and work receiver 51, the bending bed 54 is elevated by using the shaft 54a, thereby inserting the end portions 331f, 331g, 332f and 332g into the segment inserting portions 541b through 544b.

The tips of the end portions 331f, 331g, 332f and 33g which are portions joining the segments with each other) are tapered. Accordingly, only the tips are allowed to be easily received into the segment inserting portions 541b through 544b.

After inserting the tips of the segment end portions, the bending bed 54 is rotated and moved up and down.

Next, the rotation of the bending bed 54 is explained.

The bending jigs 541 and 543 are rotated clockwise by a first angle, while the bending jigs 542 and 544 are rotated counterclockwise by a second angle. Here, the first angle may not be equal, as far as a sum of the first and second angles becomes a required slot pitch.

Then, the bending bed 54 is elevated and elevated by the shaft driving mechanism 54b and rotating mechanisms 541a through 544a, in such a manner that the lengths of the end portions 331f, 331g, 332f and 332g from the exit of the slots 35 to the entrance of the segment inserting portions 541b through 544b. Here, it is preferable that the end portions 331f, 331g, 332f and 332g are rotated and elevated along arc trajectories to a prescribed angle over the angle corresponding to a half magnet pole pitch. Thus, the deformations due to a spring-back effect of the segment sets 33 are prevented.

Then, the shaft driving mechanism 54b and rotating mechanisms 541a through 544a are rotated along the reverse direction and fallen down, thereby removing the end portions 331f, 331g, 332f and 332g from the segment inserting portions 541b through 544b. Further, the bending bed 54 returns back to the original position by the rotating mechanisms 541a through 544a. Finally, the clumper 52 and work receiver 53 are removed and the stator 1 is taken out.

Summarizing the bending process, the end portions of the segment 33 are rotated, displaced and brought down along the circumferential direction. Then, the end portions are displaced along the circumferential and axial directions and are then, deeply brought down. Then, the end portions are displaced along the circumferential a d axial directions and are then, excessively deeply brought down. Then, the end portions are brought back at a prescribed positions.

The bending bed 54 moves not only along the circumferential direction but also along the axial direction. Accordingly, the end portions 331f, 331g, 332f and 332g can be bent along arc trajectories in such a manner that the lengths of the end portions 331f, 331g, 332f and 332g from the exits of the slots 35 to the entrance of the inserting portions 541b through 544b (e.g., the lengths of the end portions 331f, 331g, 332f and 332g subtracted by the length of the tips 331d, 331e, 332d and 332e) are kept constant. Accordingly, the segments 33 can not escape from the segment inserting portions 541b through 544b.

Further, only the tips 331d, 331e, 332d and 332e of the segment 33 are inserted in the segment inserting portions 541b through 544b. Accordingly, the segments 33 can not escape from the segment inserting portions 541b through 544b.

Segment Welding

After the segment bending process, the tip 331d is welded to the tip 332d', and the tip 332d is welded to the tip 331d', by, e.g., arc welding, as shown in FIGS. 1 and 2. Similarly, the tips 332e and 331e are arc-welded to the tips 331e' and 332e' (not-shown), and so forth, thereby finishing the stator coil 3.

Shape of Segment Set

The shape of the segment set 33 characterized in the present invention is explained, referring to FIGS. 10 through 13.

Figure 10:
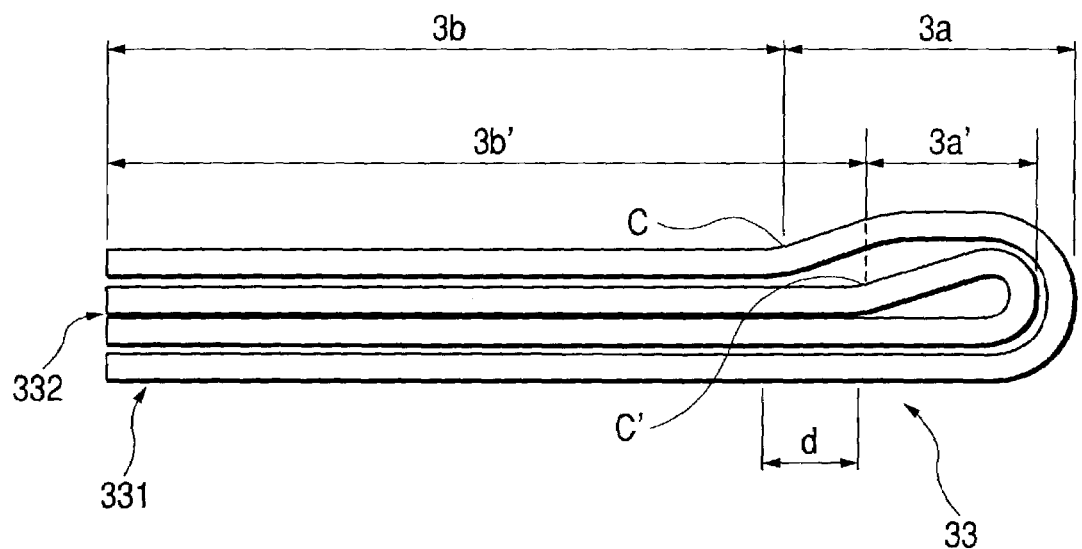
FIG. 10 is a side view of the segment set before bending in a preferred embodiment of the present invention.
Figure 11:
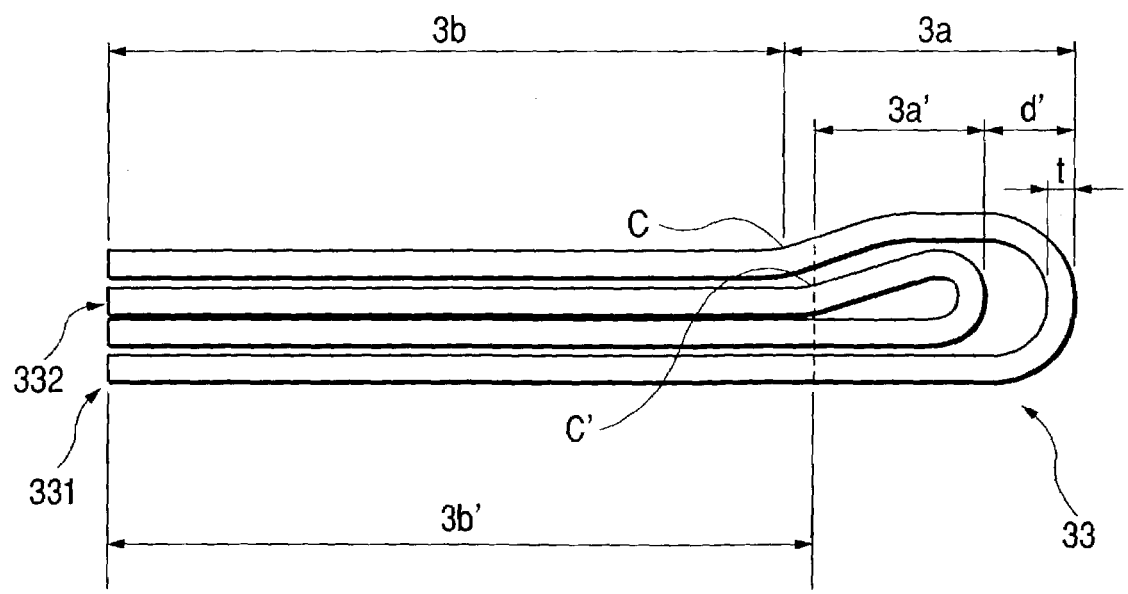
FIG. 11 is a side view of the segment set after bending in a preferred embodiment of the present invention.

FIG. 10 is a side view of the segment set 33 before bending, while FIG. 11 is a side view of the segment set 33 after bending.

As shown in FIG. 10, the large segment 331 comprises a curved head 3a and a pair of linear legs 3b, while the small segment 332 comprises a curved head 3a' and a pair of linear legs 3b'. The legs in the pair 3b' are disposed between the parallel legs of the pair 3b. Further, the curved head 3a surrounds the curved head 3a'.

The axial length (the length along the legs extended) of the curved head 3a' is made shorter than that of the curved head 3a. Further, the distance "d" between the border point "c" (the border point between the curved head 3a and legs 3b) and border point "c'" (the border point between the curved head 3a' and legs 3b') is made greater than the difference between the contraction quantity due to bending of the large segment 331 and that of the smaller segmant 332. Thus, the contracted head 3a' (relatively displaced toward the legs) can stay inside the head 3a.

As shown in FIG. 11, the axial gap "d'" between the head 3a' and 3a becomes greater than the thickness "t" of the large segment 331, after bending process, because the axial displacement of the head 3a' is relatively greater than that of the head 3a.

Figure 12:
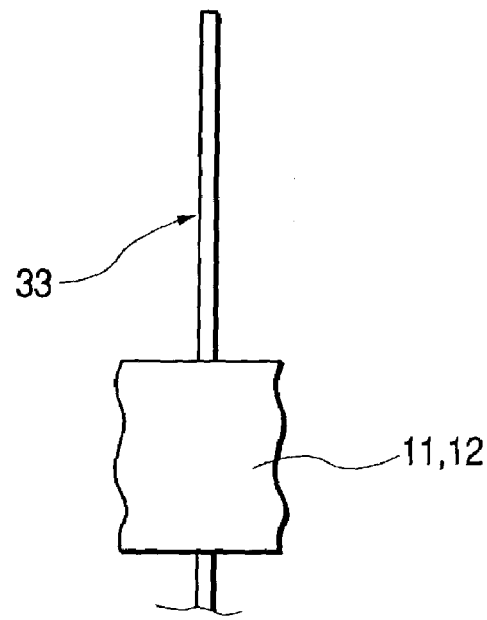
FIG. 12 shows the segment set before bending, observed from the center toward radial direction of the large and small ring s.
Figure 13:
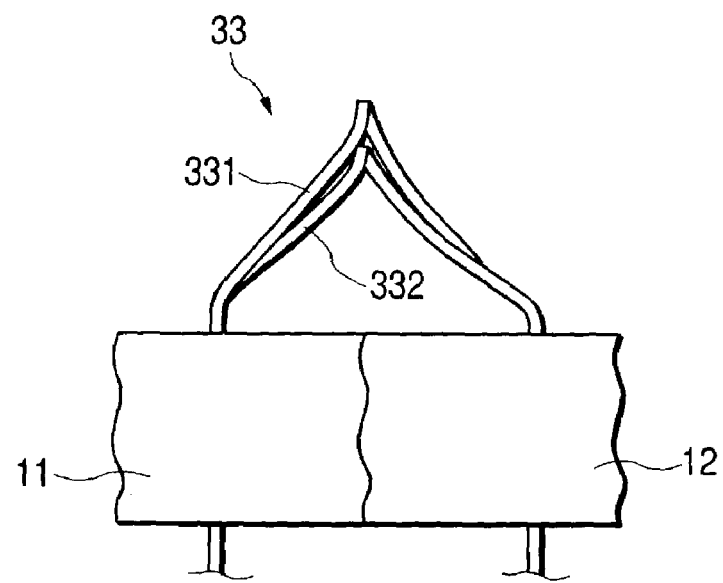
FIG. 13 shows the segment set after bending, observed from the center toward radial direction of the large and small ring s.
Figure 14:
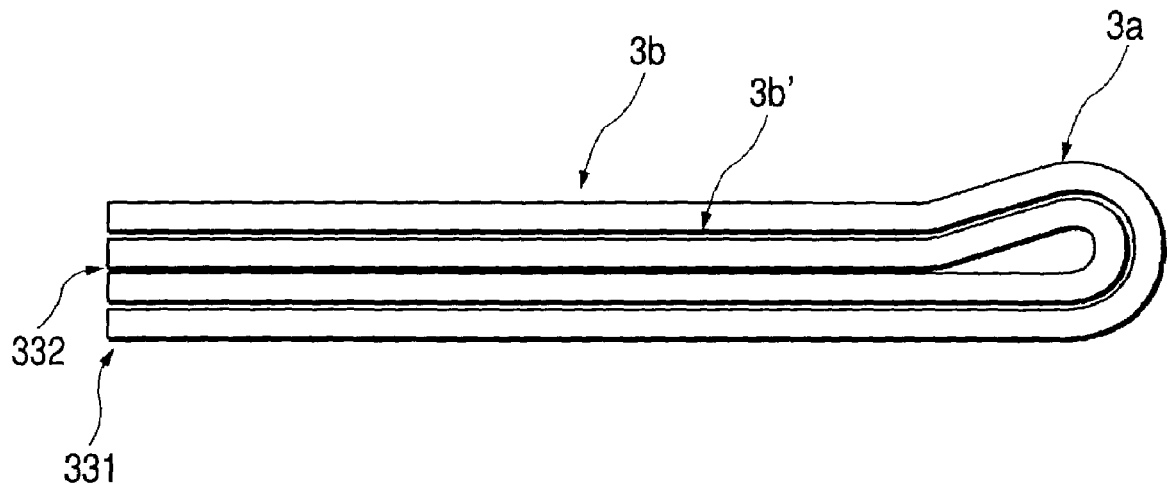
FIG. 14 is aside view of a conventional segment set before bending.
Figure 15:
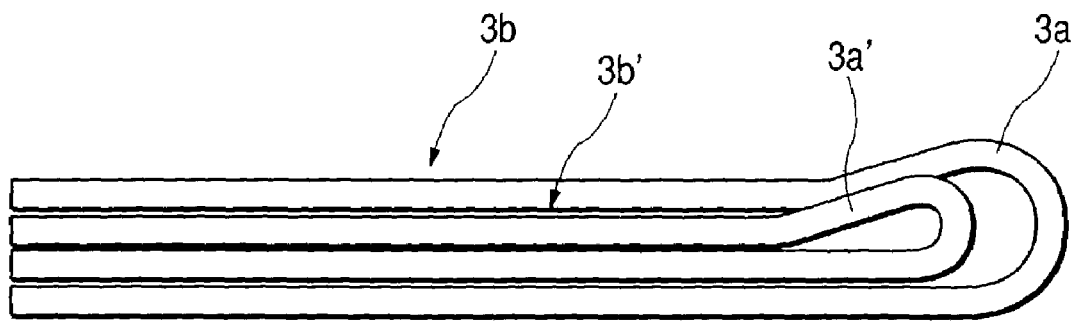
FIG. 15 is aside view of a conventional segment set after bending.
Figure 16:
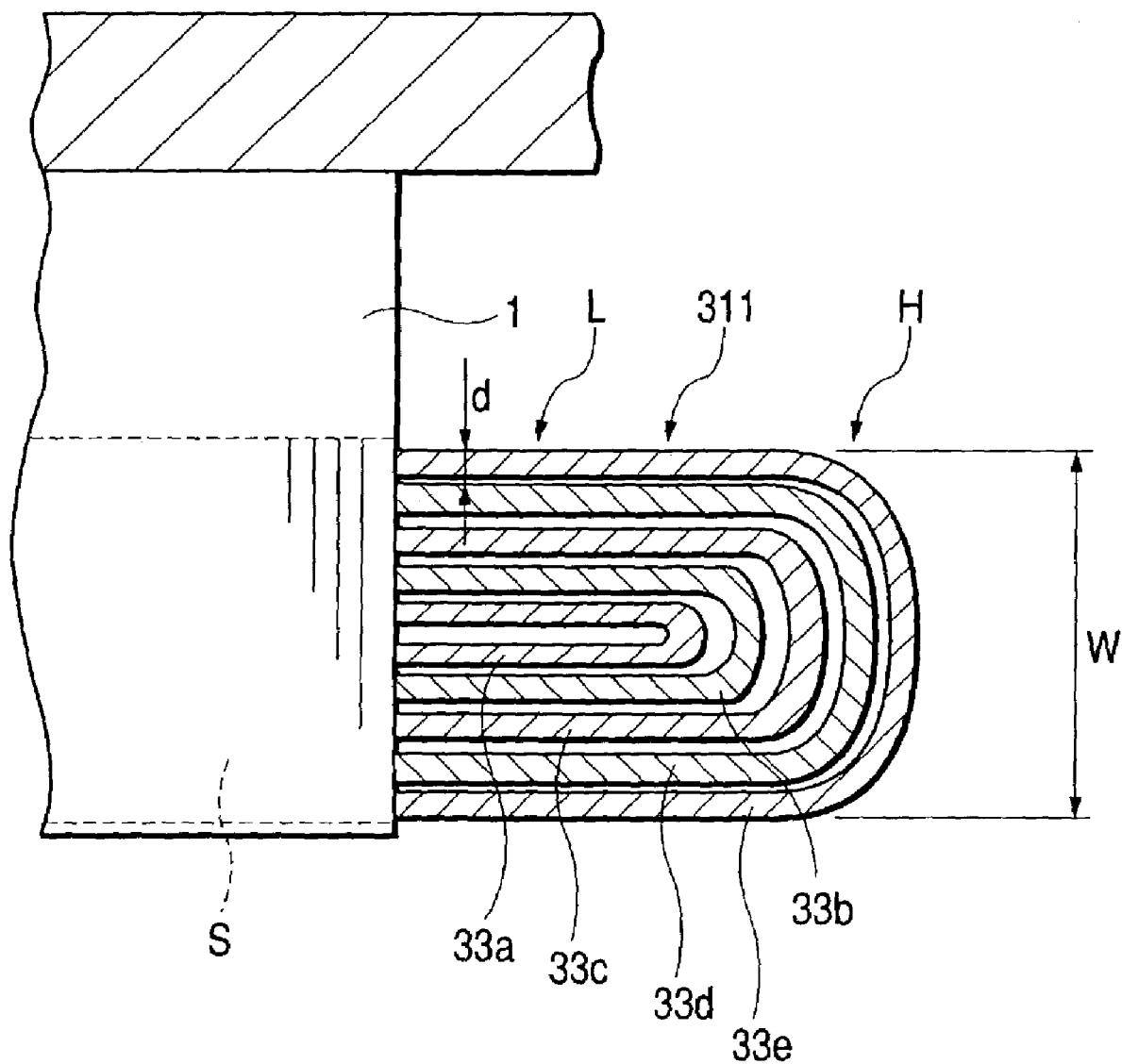
FIG. 16 is a schematic cross sectional view of the head portion of the coil end along the radial direction.

FIG. 12 shows the segment set 33 before bending (inserted in the inner ring 11 and outer ring 12) observed from the center toward the outer radial direction, while FIG. 13 shows the segment set 33 after bending, observed from the center toward the outer radial direction.

What is claimed is:

1. A stator coil, comprising:
a plurality of segments each of which is received in slots of a stator core having an even number of receiving positions in a radial direction of the stator coil, thereby constructing one turn in a phase coil in M (integer greater than or equal to 3) phase coils,
said segment comprising: a pair of slot conductor portions each of which is received in a receiving position different with each other in a pair of slots distant by a prescribed pitch; a head portion which is a head coil end and is projected toward an end of said stator core;

and a pair of projected end portions each of which is another coil end and is projected from another end of said stator core, said head portion comprising: a U-shaped head tip portion; and a pair of head oblique portions each of which is stretched obliquely along circumferential and axial directions of said stator core, said projected end portion comprising: a pair of end oblique portions each of which stretches obliquely along circumferential and axial directions of said stator core; and a pair of end tip portions each of which is formed at a tip of said end oblique portion and joined with an end tip of different end tip portion, said head portions being arranged along the radial direction of said stator core, said projected end portions being arranged along the radial direction of said stator core, wherein:

said segments are composed of a plurality of segment sets, each segment set has a small segment and a large segment, the small segment of each segment set is received in a pair of said receiving positions adjacent along the radial direction, and the large segment of the segment set is received in another pair of said receiving positions, there is a gap along the axial direction of said stator core between said head tip portion of said small segment and said head tip portion of said large segment in each segment set; and in each of the large and small segments, a width of said head portion in a width direction perpendicular to the axial direction is wider than a width of the pair of slot conductor portions in the width direction.

2. The stator coil, according to claim 1, wherein:

said segments with the same radial positions which are arranged along the circumferential direction construct a group of partial phase coils to which a prescribed phase voltage is applied; and said phase coil is constructed in such a manner that one partial phase coil is sequentially joined in series with another partial phase coil adjacent with each other along the radial direction.

3. The stator coil according to claim 2, wherein:

said stator coil has groups of slots adjacent with each other along the circumferential direction, and each of said groups is of the same phase to which the same phase voltage is applied;

said stator coil has series phase coil circuits each of which is formed in such a manner that said partial phase coils with adjacent radial positions in a slot are sequentially joined in series, and each of said phase coils are formed in such a manner that said series phase coil circuits are connected in parallel.

4. The stator coil according to claim 1, wherein a width of the gap along the width direction is greater than a thickness of the large segment.

* * * * *